June 4, 1957  E. O. L. DAZEY  2,794,333
BEVERAGE COOLERS
Filed June 11, 1956
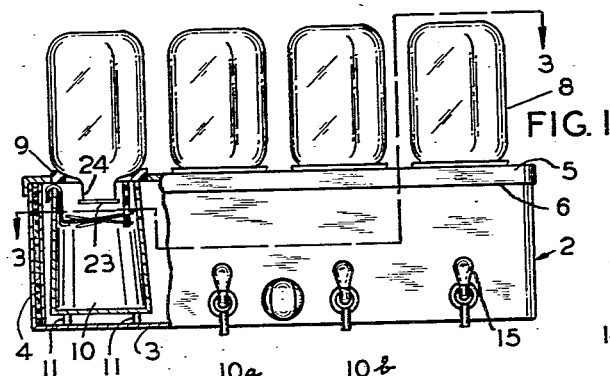
FIG. 1
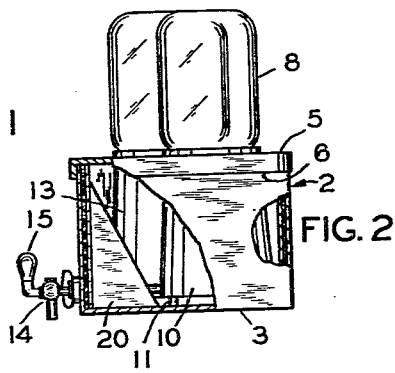
FIG. 2
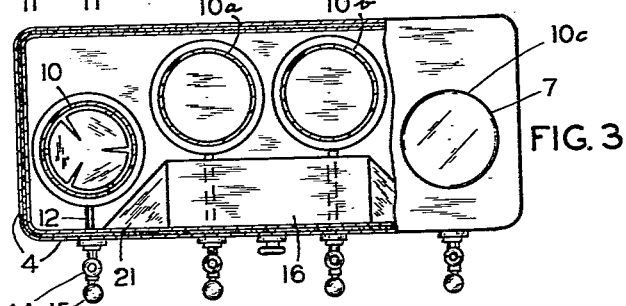
FIG. 3
FIG. 6
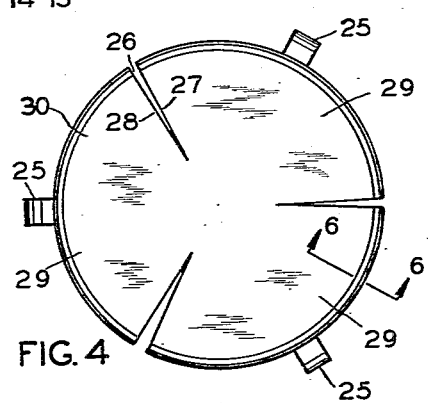
FIG. 4
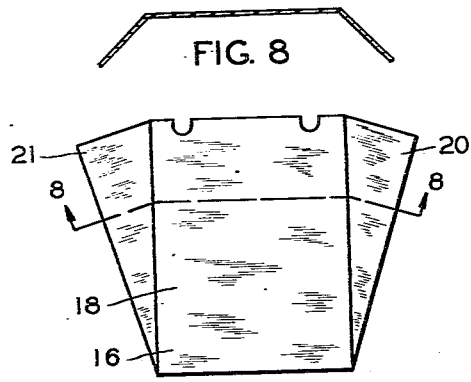
FIG. 8
FIG. 7
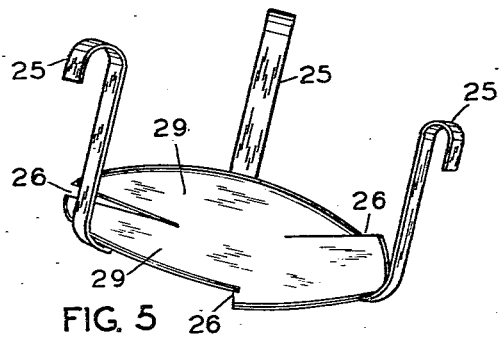
FIG. 5
INVENTOR.
Everett O. Loyal Dazey
BY
Scott L. Norvel
Atty United States Patent Office 2,794,333
Patented June 4, 1957

2,794,333

BEVERAGE COOLERS

Everett O. Loyal Dazey, Phoenix, Ariz.

Application June 11, 1956, Serial No. 590,681

5 Claims. (Cl. 62—143)

This invention concerns beverage coolers.

More particularly the invention has to do with prepared soft drinks or beverages stored in large bottles which are inverted and positioned within necks inserted in urns surrounded by ice contained in an ice container box.

Heretofore beverage and soft drink coolers of this type have consisted of a single unit in which the receiving urn was made of crockery or ceramic ware having insulating qualities and wherein no provision was made for forcing ice surrounding the urn into direct contact with the walls thereof; nor was any provision made for bringing the beverage from the bottle into intimate contact with the walls of the cooled urn.

In view of the foregoing, one of the objects of this invention is to provide a multiple beverage cooler wherein the ice container is large enough to accommodate several cooling urns adapted to hold beverage bottles, and is provided with means for forcing ice, in the container, into intimate and continuous contact with the outer walls of the beverage cooling urns;

Another object to provide, within the ice containing box, cooling urns made of non-corrosive, heat conductive, circular shaped so that heat contained in the beverage in the inverted beverage bottles will be quickly removed by the ice surrounding the cooling urn;

Another object is to provide a means for directing the warm beverages from the inverted containing bottles to intimate contact with the inner walls of the cooling urn by directing the flow of the beverage from the mouth of each bottle in a circular or spiral path so that they will flow downward in contact with the cooled walls of the urn, and not flow immediately and centrally to the bottom of the urn, before being drawn off for use.

I attain the foregoing objects by means of the devices illustrated in the accompanying drawing in which—

Figure 1 is a front elevation of a beverage cooling device embodying my improvements;

Figure 2 is a side view thereof;

Figure 3 is a plan view thereof with certain portions of the top broken away to show interior construction;

Figure 4 is a plan view of a beverage direction flow plate, drawn on an enlarged scale;

Figure 5 is a perspective view of said plate showing the means to support the plate within the beverage urn below the mouth of the inverted beverage containing bottle;

Figure 6 is a fragmentary sectional view of the fluid directing plate, also drawn on an enlarged scale, and taken substantially on line 6—6 of Figure 4;

Figure 7 is a plan view of an ice deflecting baffle used in the ice containing case; and Figure 8 is a section thereof taken substantially on line 8—8 of Figure 7.

Similar numerals refer to similar parts in the several views.

It is to be understood that this invention pertains to the type of beverage cooler shown particularly in Figures 1, 2 and 3. In these figures 2 represents a rectangularly shaped ice containing box having a bottom plate 3, side and end walls 4 and a removable top 5 which has a rim 6 adapted to fit over the top of the box 2. The lid has circular holes or perforations 7 to receive the neck portion of beverage bottles 8. These bottles are inverted and their neck portions placed in the perforations 7 so that they are supported by rubber rings 9 which line the edges of each perforation.

Below each perforation 7 there is a cooling receptacle or urn 10 which is made of non-corrosive metal, such as for example, stainless steel. These urns are set into and may be attached to the case bottom 3 by brackets 11, so that their bottoms are spaced slightly above the bottom of the box. Each urn has an outlet pipe 12 in its bottom, which leads outward through the bottom portion of front wall 4 of case 2 and terminates in a faucet or spigot 14 which has a conveniently placed operating knob 15. A drain valve 14 is included in the front wall 4 to remove water from the bottom of case 2.

Each of the four urns 10 is placed below a respective perforation 7 in top 5 and all are arranged throughout the planar area of the top 5 so that they will be evenly positioned within the area of the case. Each urn is constructed substantially the same as the others, and has rounded sidewalls 13 which diverge downwardly, and each is closed by a flat circular bottom. The downwardly increasing diameter of the urn walls keeps cracked ice in contact with the walls as it melts and its level lowers in case 2.

Within case 2 there is an ice directing baffle 16 which has a central plate 18 slanting from the front wall 4 rearwardly and downwardly toward the adjacent wall portions of the urns 10a and 10b. Along each lateral edge of plate 18 there are triangular shaped plates 20 and 21, respectively, which slant downwardly, rearwardly, and laterally toward the respective ends of case 2. These side plates direct ice toward the adjacent walls of the end urns 10 and 10c. The purpose of this baffle is to direct ice which has been introduced into the front portion of case 2 toward the walls of the several urns positioned within it.

When the case is prepared for use cracked ice is introduced evenly into it until it is substantially filled. This ice contacts and cools the walls of the several urns. As beverages are drawn from the urns the ice tends to melt away from the outer walls of the turns and in time an air space may form between the ice and the urns. This is partially due to the fact that the ice tends to compact within the case and will not continue in contact with the walls of the urns unless it is forced down and toward these walls. Baffle 16 is used so that the ice tends to slide along its plates and is directed toward the walls of the urns. Thus, the ice, as it melts, slides against and remains in contact with the adjacent wall portions of the several urns. The slanting sides of the urns assist in maintaining surface contact with the ice. Therefore, there is always ice contacting the urn walls.

Whereas I have shown but one baffle which is positioned adjacent the front wall of the case it is to be understood that other baffles of a similar type may be introduced along any of the other side walls where necessary to force the ice into contact with the urn walls.

The operation of the common inverted-bottle type of beverage dispenser is well known. Beverages, such as lemonade, are introduced into these bottles and then the bottles are inverted and placed in the openings 7 in the ice box top as shown and as above described. The beverage flows from bottle 8 into the urn while air displaces the liquid in the bottle. The beverage rises in places the liquid in the bottle. The beverage rises in the urn until it covers the mouth 23 of the bottle neck 24. When the mouth is covered with liquid no further air can enter the bottle and the liquid level is maintained at the bottle mouth. As the beverage is drawn from any one of the urns through its tube 12 it is replaced by more liquid from the bottle. This liquid is warm and at room temperature. Normally this liquid descends from the bottle mouth to the bottom of the urn. After the first portion of cooled liquid is drawn from the bottom of the urn the next portion available, to be drawn off through pipe 12, would normally be warm, since it has not had an opportunity to adequately come in contact with the cooled walls of the urn. I have corrected this objection by providing the deflection plate 30 which is circular, fits loosely into the urn, and is positioned slightly below the bottle mouth 23, being supported by stirrups 25. The rim of the plate 30 is cut radially inward in three places 26 forming sectors constituting directive vanes. The edges 27 and 28 adjacent each cut are bent so that one edge is raised above the level of the plane of the plate and the other depressed below it. Thus a directive group of baffles, circularly arranged around the edge of the disk, is produced which tends to give the fluid beverage descending from the mouth of the bottle a circular motion. This forces it outward and around the inner face of the wall of each urn and rapidly cools it. There is, therefore, always cooled beverage in the bottom of each urn, ready to be drawn off through any one of spigots 14.

It is to be noted that urns 10 are closely positioned relative to each other so that a bridge of compacted ice will not form between them and prevent the ice in the front of the case from moving rearwardly toward the surfaces of the walls 11 of the urns. When spaced closely there is only a small neck of ice between the urns, and this yields easily to the rearward push of ice from baffle 16.

Both the slanting wall sides of the urns, and the baffles 16 tend to force the loosely packed ice into contact with the urn walls. As the ice melts and its volume decreases its level descends. The ice around the slanting walls of the urns therefore keeps in contact with the walls as it descends.

While the urns 10 are shown as being circular, and with their slanting walls have the appearance of the frustum of a cone, it is to be understood that the walls may include flat surfaces and that the urns may be made with the appearance of the frustum of a pyramid.

The advantages of the case with baffle 16, or other similar baffles adjacent other sides or ends is that the ice is kept in contact with the urn walls; likewise the advantages of the deflection plates 30 is that the beverages are brought into contact with these urn walls. The overall combined effect therefore, is that the beverages are cooled more effectively and efficiently than they are in beverage coolers heretofore made.

I claim:

1. A beverage cooler composed of an ice containing case having a bottom, a plurality of beverage cooling urns supported on said case bottom in spaced relation therewith, each urn being provided with a beverage withdrawal pipe and spigot, and each urn being adapted to receive and hold an inverted beverage bottle within its top, and a baffle within said case slanting downwardly toward said urns to guide ice within said case toward the outer walls of said urns, and deflectors within said urns guiding fluid beverages, descending from bottles in said urns, in a rotative direction so that they are urged outwardly and around the walls of the urns, by centrifugal force.

2. In a beverage cooler, a cooling urn having a circular metal body with outwardly and downwardly slanting walls to maintain contact with melting ice surrounding said urn, a pipe and spigot at the bottom of said urn for drawing off cooled beverages, an inverted bottle means at the top of said body supporting the neck portion of an inverted bottle, and a deflection plate disposed just below the mouth of the bottle inverted in said urn, having directive baffles, formed of sectors of said plate slanted at similar angles, and guiding fluid beverages descending from said bottles so that the liquid moves rotatively whereby centrifugal force urges the liquid against the walls of said urn.

3. A beverage cooler composed of an ice containing case having a bottom, a plurality of beverage cooling urns supported on said case bottom in spaced relation therewith, each provided with a beverage withdrawal pipe and spigot, and means for cooling beverages in said urns from cracked ice contained within said case including a baffle within said case slanting from the top of a side of said case toward the outer surfaces of said urns; said urns having downwardly and outwardly slanting sides to maintain contact with said ice after it melts, shrinks, and descends in said case, and each urn being disposed closely to the adjacent urn so that cracked ice will not re-solidify between the urns and form an ice bridge tending to resist the flow of ice from said baffle toward the surfaces of said urns consisting of angularly slanted fins, and deflectors within said urns guiding fluid beverages, descending from bottles in said urns rotatively and outwardly around the walls of the urns.

4. A beverage cooler composed of an ice containing case adapted to hold loosely packed cracked ice, having a flat bottom, side and end walls, and a top having a plurality of openings adapted to receive the upper neck portion of beverage bottles and support said bottles in inverted position, a plurality of metal beverage cooling urns, having circular bodies supported on said case bottom in spaced relation therewith, with spigots connected to their bottom portions, and having their tops disposed below the openings in said case top and adapted to receive the neck portions of said inverted beverage bottles; an ice directing baffle within said case slanting downwardly and inwardly from a top edge thereof, and urging said cracked ice into contact with the walls of said urns as the volume of said ice shrinks due to melting; together with means for bringing beverages entering said urns from said bottles into contact with the inner walls of said urns, consisting of deflection plates disposed in each urn just below the mouth of the beverage bottle therein; said deflection plates having directive vanes guiding beverages descending from said bottle mouths to flow rotatively so that centrifugal force well urge the beverage outward toward the walls of said urns.

5. A beverage cooler composed of an ice containing case adapted to hold loosely packed cracked ice, having a flat bottom, side and end walls, and a top having a plurality of openings adapted to receive the neck portion of inverted beverage bottles, and adapted to support said bottles in inverted position, a plurality of metal beverage cooling urns, having circular bodies supported on said case bottom in spaced relation therewith, and provided with spigots connected to their bottom portions, and having their tops disposed below the openings in said case top and adapted to receive the neck portions of said inverted beverage bottles, and a directing baffle slanting downwardly and inwardly toward said urns in said case and disposed to urge cracked ice within said case into contact with the walls of said urns as said ice melts and moves downward in said case.

References Cited in the file of this patent
UNITED STATES PATENTS

| | | |
|---|---|---|
| 1,726,093 | Williams | Aug. 27, 1929 |
| 2,186,900 | Dick et al. | Jan. 9, 1940 |
| 2,523,074 | Stephens | Sept. 19, 1950 |